US009512963B2

(12) United States Patent
Conley et al.

(10) Patent No.: US 9,512,963 B2
(45) Date of Patent: Dec. 6, 2016

(54) LUBRICANT VENT VALVE WITH STEPPER MOTOR DRIVE

(71) Applicant: Lincoln Industrial Corporation, St. Louis, MO (US)

(72) Inventors: Paul Conley, St. Charles, MO (US); Viktor Alekseyev, III, St. Louis, MO (US); Jeff Kotyk, St. Louis, MO (US)

(73) Assignee: LINCOLN INDUSTRIAL CORPORATION, St. Louis, MO (US)

( * ) Notice: Subject to any disclaimer, the term of this patent is extended or adjusted under 35 U.S.C. 154(b) by 87 days.

(21) Appl. No.: 14/391,432

(22) PCT Filed: Apr. 9, 2013

(86) PCT No.: PCT/US2013/035800
§ 371 (c)(1),
(2) Date: Oct. 9, 2014

(87) PCT Pub. No.: WO2013/155082
PCT Pub. Date: Oct. 17, 2013

(65) Prior Publication Data
US 2015/0211680 A1   Jul. 30, 2015

Related U.S. Application Data

(60) Provisional application No. 61/621,633, filed on Apr. 9, 2012.

(51) Int. Cl.
*F16K 31/04* (2006.01)
*F16N 29/02* (2006.01)
(Continued)

(52) U.S. Cl.
CPC ............. *F16N 29/02* (2013.01); *F16K 31/046* (2013.01); *F16K 31/508* (2013.01); *F16N 7/385* (2013.01); *F16N 2260/50* (2013.01)

(58) Field of Classification Search
CPC .... F16K 31/055; F16K 31/041; F16K 31/508; F16K 31/50; F16K 1/02; F16N 29/02; F16N 2260/50; F16N 7/385; F04C 14/24; F04B 53/10; Y10T 137/86027; Y10T 137/8634; Y10T 137/6137; Y10T 137/614
(Continued)

(56) References Cited

U.S. PATENT DOCUMENTS 4,797,834 A * 1/1989 Honganen ........... F04B 11/0058
137/2
4,955,792 A * 9/1990 Skarupa .................. F16N 13/16
184/29

(Continued)

FOREIGN PATENT DOCUMENTS

JP         2000 337119 A      12/2000

*Primary Examiner* — Matthew W Jellett
(74) *Attorney, Agent, or Firm* — Mark Ussai; SKF USA Inc. Patent Dept.

(57) ABSTRACT

A lubrication system vent valve includes a valve body having a flow passage with an inlet fluidly coupled with a supply and an outlet fluidly coupled with a dispenser, and a vent passage with an inlet port fluidly coupled with the flow passage and an outlet port. A closure element disposed within the vent passage has a threaded portion and is linearly displaceable between an open position where the vent ports are fluidly coupled to permit lubricant flow from the primary passage and out of the body through the vent outlet port, and a closed position at which fluid flow between the vent ports is substantially prevented. A motor has a shaft with a threaded portion engaged with the closure element such that shaft rotation in one direction displaces the closure element toward the closed position and shaft rotation in an opposing direction displaces the element toward the open position.

20 Claims, 20 Drawing Sheets

(51) Int. Cl.
*F16K 31/50* (2006.01)
*F16N 7/38* (2006.01)

(58) Field of Classification Search
USPC ........ 251/129.11, 264, 266, 267; 137/565.16
See application file for complete search history.

(56) References Cited

U.S. PATENT DOCUMENTS

| | | | | |
|---|---|---|---|---|
| 5,060,910 | A | * | 10/1991 | Iwata ..................... F16K 31/04 251/129.05 |
| 5,242,404 | A | * | 9/1993 | Conley ............... A61M 1/0031 604/119 |
| 5,364,066 | A | * | 11/1994 | Dorste ..................... F16K 1/38 251/122 |
| 6,216,822 | B1 | | 4/2001 | May et al. |
| 6,561,480 | B1 | * | 5/2003 | Komiya ................... F16K 1/38 251/122 |
| 6,705,432 | B2 | * | 3/2004 | Conley .................. F16N 27/00 184/29 |
| 7,900,888 | B2 | * | 3/2011 | Weldon .................. F16K 31/04 251/129.11 |
| 8,191,860 | B2 | * | 6/2012 | Eschborn ............... F16K 31/54 251/129.11 |
| 2007/0018128 | A1 | | 1/2007 | Arai |
| 2009/0121051 | A1 | | 5/2009 | Michael |

* cited by examiner

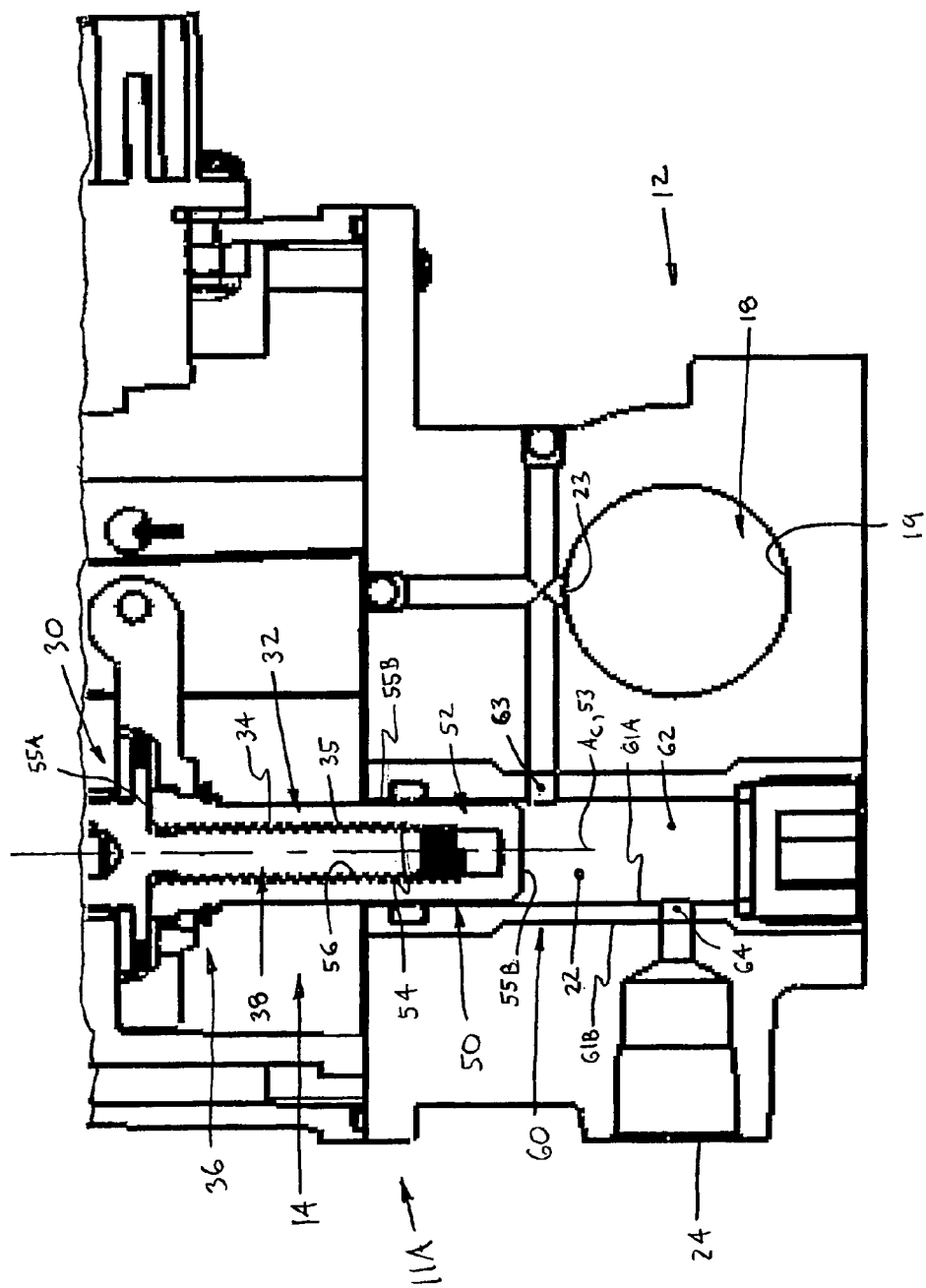

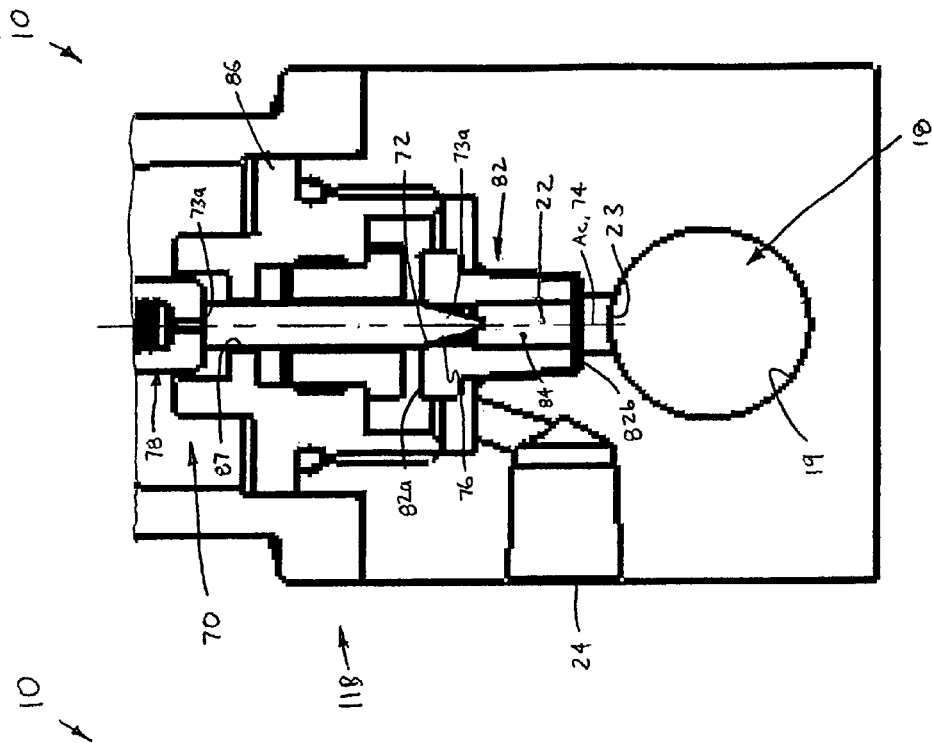
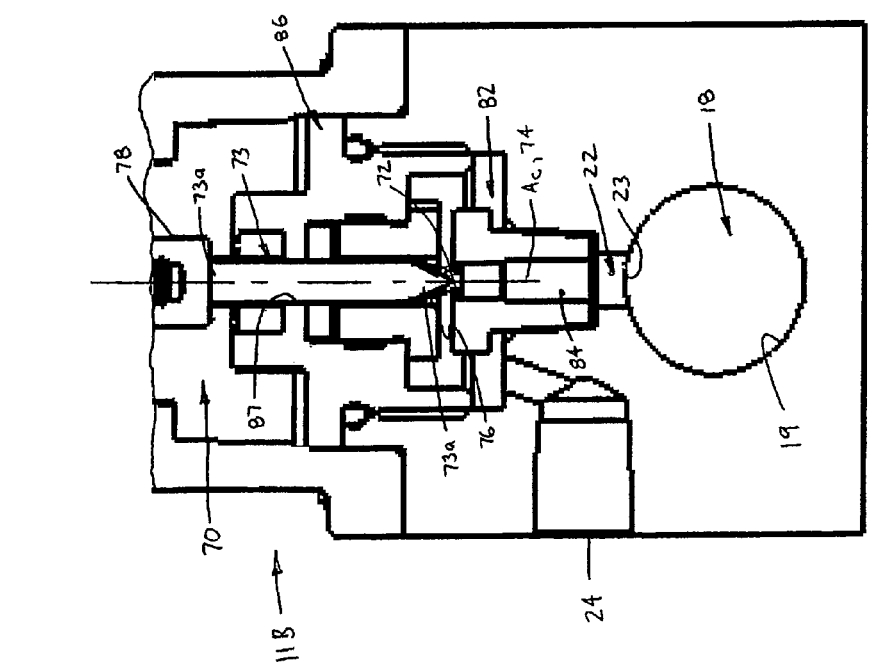
FIG. 12
FIG. 13

LUBRICANT VENT VALVE WITH STEPPER MOTOR DRIVE

BACKGROUND OF THE INVENTION

The present invention relates to valves, and more particularly to electric vent valves used in lubrication systems.

Certain lubrication systems require a vent valve to release lubricant pressure upon completion of a lubrication cycle. Such a system may be a "single line" lubrication system that includes one or more lubricant dispensers (e.g., injectors) to dispense lubricant to one or more devices (e.g., bearings), a supply of lubricant, a supply line fluidly connecting the supply with the dispenser, and a pump to pressurize lubricant in the supply line to flow from the supply to the dispenser(s). Typically, a controller is provided to initiate pump operation when lubrication is required and to shut off the pump when a desired maximum lubricant pressure in the dispenser(s) is reached, as determined typically with a pressure switch.

Further, the vent valve is provided to "bleed off" pressure in the supply line once the desired maximum lubricant pressure is achieved, and may be hydraulically, pneumatically or electrically driven. Previously known electric vent valves typically include a spool driven by a solenoid that moves the spool between open and closed positions. These valves are normally open and are driven to close when a lubrication cycle is initiated. Due to the relatively high pressures reached in the lubricant supply line, particularly when the lubricant is grease as opposed to lower viscosity oils, the solenoid must maintain the spool in the closed position against a substantial force acting on the spool that tends to push the spool toward the open position. The solenoid force required to maintain the spool at the closed position against such high pressure is generally difficult to achieve with a typical low voltage power supply (e.g., 24 volts). Furthermore, due to the relatively short stroke of a typical solenoid, the valve orifices must be made relatively small, which leads to rapid erosion of metal parts of the valve particularly when handling high pressure grease.

With prior art solenoid type valves, the relatively small size of the orifices restricts the flow of grease during the bleed off phase of the lubrication cycle. In cold temperature climates, particularly with a relatively "stiff" grease, such small orifices can prevent the grease from flowing through the valve back to the grease supply; thus the bleed off phase is not achieved. Unless the bleed off phase is complete, the lubrication system can not function. Typically, the pressures in the lubrication system reach up to 3,500 psi up to a maximum of 5,000 psi to operate the lubrication valves (injectors) and then must bleed off to less than 400 psi. The small orifices also subject the valve to clogging if even small amounts of contaminants are present in the grease.

SUMMARY OF THE INVENTION

In one aspect, the present invention is a vent valve for a lubrication system, the lubrication system having a lubricant supply and a lubricant dispenser. The vent valve comprises a valve body having a flow passage, the flow passage having an inlet fluidly coupled with the supply and an outlet fluidly coupled with the dispenser, and a vent passage with an inlet port fluidly coupled with the flow passage and an outlet port. A closure element is disposed at least partially within the vent passage, has a threaded portion and is linearly displaceable between an open position, at which the vent inlet and outlet ports are fluidly coupled to permit lubricant to flow from the primary passage and out of the body through the vent outlet port, and a closed position, at which fluid flow between the vent inlet and outlet ports is substantially prevented. Further, a motor has a shaft rotatable about a central axis, the shaft having a threaded portion threadedly engaged with the closure element threaded portion. As such, rotation of the shaft in a first direction about the axis displaces the closure element toward the closed position and rotation of the shaft in a second, opposing direction about the axis displaces the closure element toward the open position.

In another aspect, the present invention is again a vent valve for a lubrication system, the lubrication system having a lubricant supply and a lubricant dispenser. The vent valve comprises a valve body having a flow passage, the flow passage having an inlet fluidly coupled with the supply and an outlet fluidly coupled with the dispenser, and a vent passage with an inlet port fluidly coupled with the flow passage and an outlet port. A closure element is disposed at least partially within the vent passage and is linearly displaceable between a closed position, at which fluid flow between the vent inlet and outlet ports is substantially prevented, and an open position, at which the vent inlet and outlet ports are fluidly coupled to permit lubricant to flow from the primary passage and out of the body through the vent outlet port. A motor has a shaft rotatable about a central axis, the shaft being engaged with the closure element such that rotation of the shaft in a first direction about the axis displaces the closure element toward the open position and rotation of the shaft in a second, opposing direction about the axis displaces the closure element toward the closed position. Further, a control is operatively coupled with the motor and is configured to receive first and second inputs, to drive the motor to rotate the shaft in the first direction when the control receives the first input and the closure element is at the open position and to drive the motor to rotate the shaft in the second direction when the control receives the second input when the closure element is at the closed position.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 4, are each a reduced size view of the valve depicted in FIG. 3, FIG. 4A showing a valve open configuration and FIG. 4B showing a valve closed configuration;

FIG. 5 is an enlarged broken-away view of the lower portion of FIG. 4A, showing a spool closure element in an open position;

FIG. 11, are each a reduced size view of the valve depicted in FIG. 10, FIG. 11A showing a valve open configuration and FIG. 11B showing a valve closed configuration;

FIG. 12 is an enlarged broken-away view of the lower portion of FIG. 11A, showing a poppet closure element in an open position;

FIG. 13 is an enlarged broken-away view of the lower portion of FIG. 11B, showing the poppet closure element in a closed position;

FIG. 17, are each a reduced size view of the valve depicted in FIG. 16, FIG. 17A showing a valve open configuration and FIG. 17B showing a valve closed configuration;

DETAILED DESCRIPTION OF THE INVENTION

Figure 1:
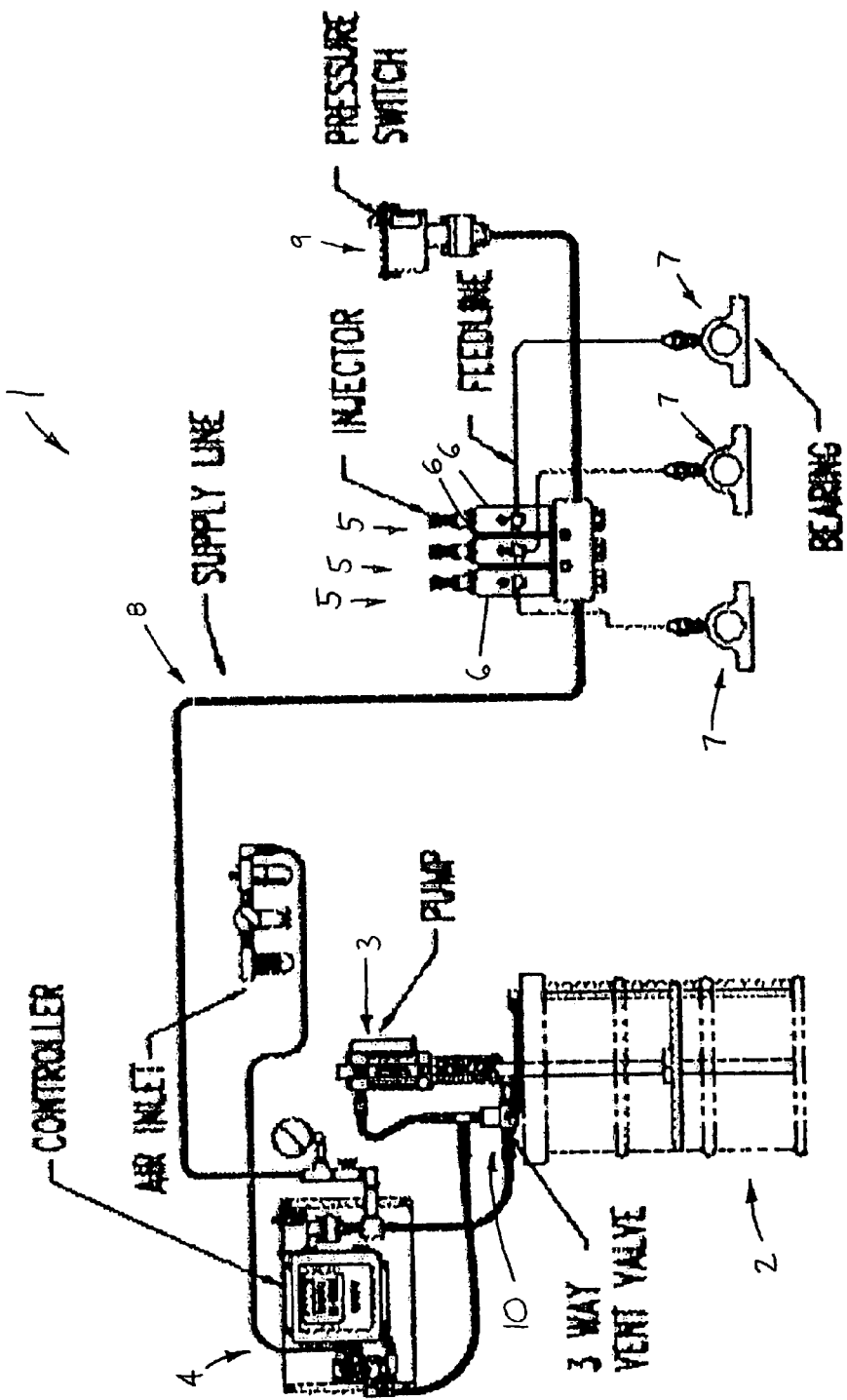
FIG. 1 is a schematic view of a lubrication system including a vent valve in accordance with the present invention.

Certain terminology is used in the following description for convenience only and is not limiting. The words "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words of similar import.

Figure 2:
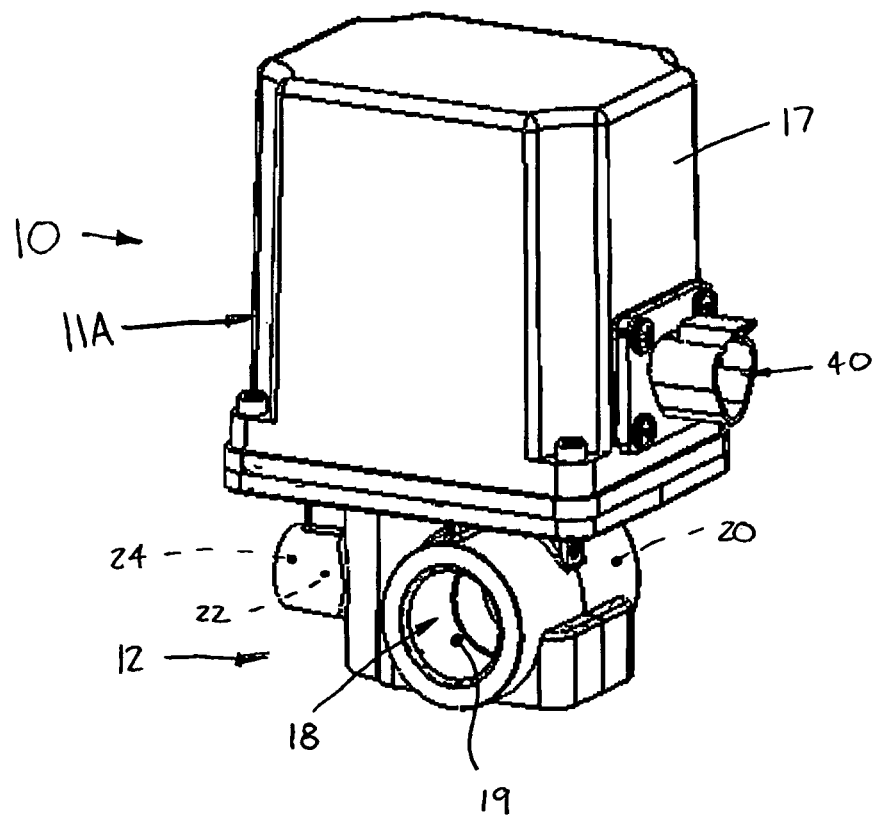
FIG. 2 is a perspective view of a first construction of the vent valve in accordance with the present invention.

Referring now to the drawings in detail, wherein like numbers are used to indicate like elements throughout, there is shown in FIGS. 1-14 a vent valve 10 for a lubrication system 1 that includes a lubricant supply 2, a pump 3, a lubricant controller 4, and at least one and preferably a plurality of lubricant dispensers 5, most preferably injectors 6 for supplying lubricant to bearings 7. The vent valve 10 basically comprises a valve body 12, a movable closure element 14 disposed within the valve body 12, and a motor 16 operatively coupled with the closure element 14, which is preferably a stepper motor as discussed below. The valve body 12 has a primary flow passage 18, the flow passage 18 having an inlet 19 fluidly coupled with the lubricant supply 2 and an outlet 20 (FIGS. 2, 9 and 15) fluidly coupled with the lubricant dispenser(s) 5, preferably through a supply line 8, and a vent passage 22. The vent passage 22 has an inlet port 23 fluidly coupled with the flow passage 18 and an outlet port 24, which is preferably fluidly coupled with the lubricant supply 2.

The closure element 14 is disposed at least partially within the vent passage 22 and has a threaded portion 26, most preferably an internally threaded bore 56 or 79, as described below. The closure element 14 is linearly displaceable along a central axis $A_C$ between an open position $P_O$, depicted in FIGS. 3, 4A, 5, 10, 11A, 12, 16, 17A and 18, and a closed position $P_C$, as shown in FIGS. 5A, 6, 11B, 13, 17B and 19. When the closure element 14 is located at the open position $P_O$, the vent inlet and outlet ports 23, 24 are fluidly coupled to permit lubricant to flow from the primary passage 18 and out of the valve body 12 through the vent outlet port 24, and preferably back into the lubricant supply 2. Also, when the closure element 14 is disposed at the closed position $P_O$, fluid flow between the vent inlet and outlet ports 23, 24 is substantially prevented, such that all lubricant that flows into the primary passage 18 from the inlet 19 flows out of the outlet 20, and thereafter to the lubricant dispenser(s) 5.

Further, the motor 16 is preferably contained within a housing 17 attached to the valve body 12 and has a shaft 30 rotatable about a central axis $A_M$, which is preferably substantially co-linear with the closure element axis $A_C$. The shaft 30 has a threaded portion 32 threadedly engaged with the closure element threaded portion 26. With such threaded engagement, rotation of the motor shaft 30 in a first direction $R_1$ (FIGS. 3 and 16) about the axis $A_M$ displaces the closure element 14 toward the closed position $P_C$. Alternatively, rotation of the shaft 30 in a second, opposing direction $R_2$ (FIGS. 3 and 16) about the axis $A_M$ displaces the closure element 14 toward the open position $P_O$. It should be noted that, in two preferred valve constructions 11A, 11B as disclosed herein below, the first direction $R_1$ is clockwise and the closure element 14 displaces generally downwardly along the central axis $A_C$ from the open position $P_O$ to the closed position $P_C$, and vice-versa. Alternatively, in a third preferred valve construction 11C, the first direction $R_1$ is counter-clockwise and the closure element 14 displaces generally upwardly along the central axis $A_C$ from the open position $P_O$ to the closed position $P_C$, and vice-versa.

Furthermore, the motor threaded portion 32 and the closure element threaded portion 26 are configured such that the engagement of the two threaded portions 32, 26 substantially prevents displacement of the closure element 14 when the closure element 14 is subjected to lubricant pressure. That is, the engaged threads of the motor shaft 30 and closure element 14 "lock" to prevent back-driving of the closure element 14 when subjected to substantial lubricant pressure. As such, in a second valve construction (FIGS. 9-14) described in detail below, the motor 16 is not required to exert a substantial torque to maintain the closure element 14 in the closed position $P_C$ even when the pressure of lubricant within the vent inlet port 23 reaches a relatively high level, no torque being required for the first valve construction (FIGS. 2-8) and third valve construction (FIGS. 15-21) for reasons described below.

Referring to FIGS. 3, 7, 8, 10 and 14, the vent valve 10 preferably further comprises a valve control 40 operatively coupled with and configured to drive the motor 16 to controllably displace the closure element 14 between the open and closed positions $P_O$, $P_C$. Preferably, the control 40 is configured to receive first and second inputs $I_1$, $I_2$ (see FIGS. 10 and 14) and to drive the motor 16 to rotate the shaft 30 in each one of the opposing directions $R_1$, $R_2$, in response to the inputs $I_1$, $I_2$. Specifically, the valve control 40 is configured to drive the motor 16 to rotate the shaft 30 in the first direction $R_1$ when the control 40 receives the first input $I_1$ and the closure element 14 is located at the open position $P_O$, such that the closure element 14 is displaced to the closed position $P_C$. Also, the control 40 is configured to drive the motor 16 to rotate the shaft 30 in the second direction $R_2$ when the control 40 receives the second input $I_2$ and the closure element 14 is at the closed position $P_C$, such that the closure element 14 is displaced to the open position $P_O$. Preferably, the first input is a voltage signal $S_V$ from a power supply (not shown) and the second input $I_2$ is a combination of the power supply voltage signal $S_V$ and a control signal $S_C$ from the lubrication system controller 4, as described in further detail below.

Further, the motor 16 is a stepper motor (as mentioned above) configured to rotate the motor shaft 30 through a predetermined number of revolutions about the motor axis $A_M$ so as to displace the closure element 14 between the open and closed positions $P_O$, $P_C$, respectively. More specifically, with the preferred valve control 40, the control 40 is configured to drive the motor 16 to rotate a predetermined number of revolutions about the axis $A_M$ in the first direction $R_1$ when the control 40 receives the first input $I_1$ and the closure element is located at the open position $P_O$. The control 40 is also configured to drive the motor 16 to rotate a predetermined number of revolutions about the axis $A_M$ in the second direction $R_2$ when the control 40 receives the second input $I_2$ and the closure element 14 is located at the closed position $P_C$.

Figure 3:
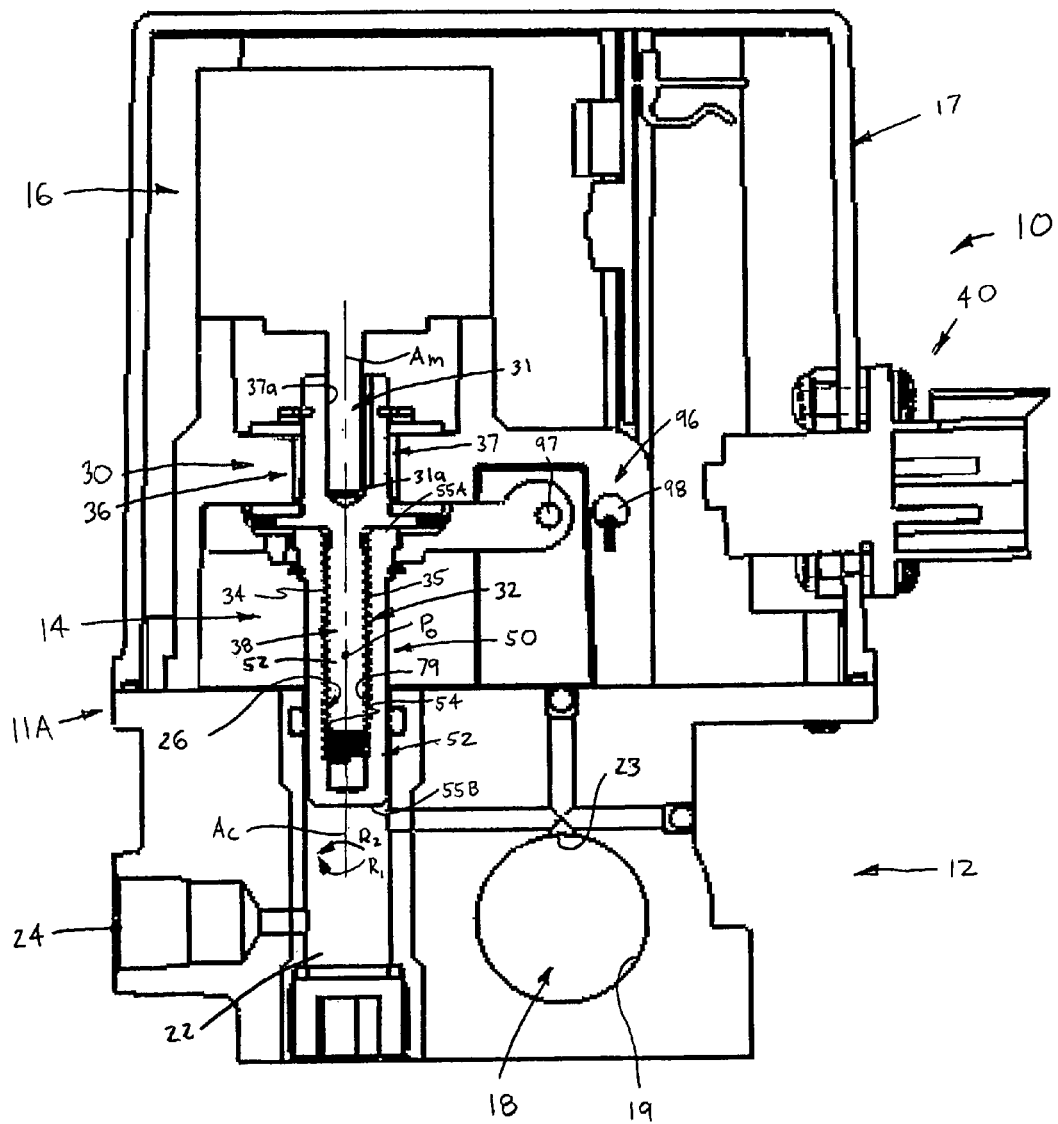
FIG. 3 is an axial cross-sectional view of the vent valve of FIG. 2.
Figure 10:
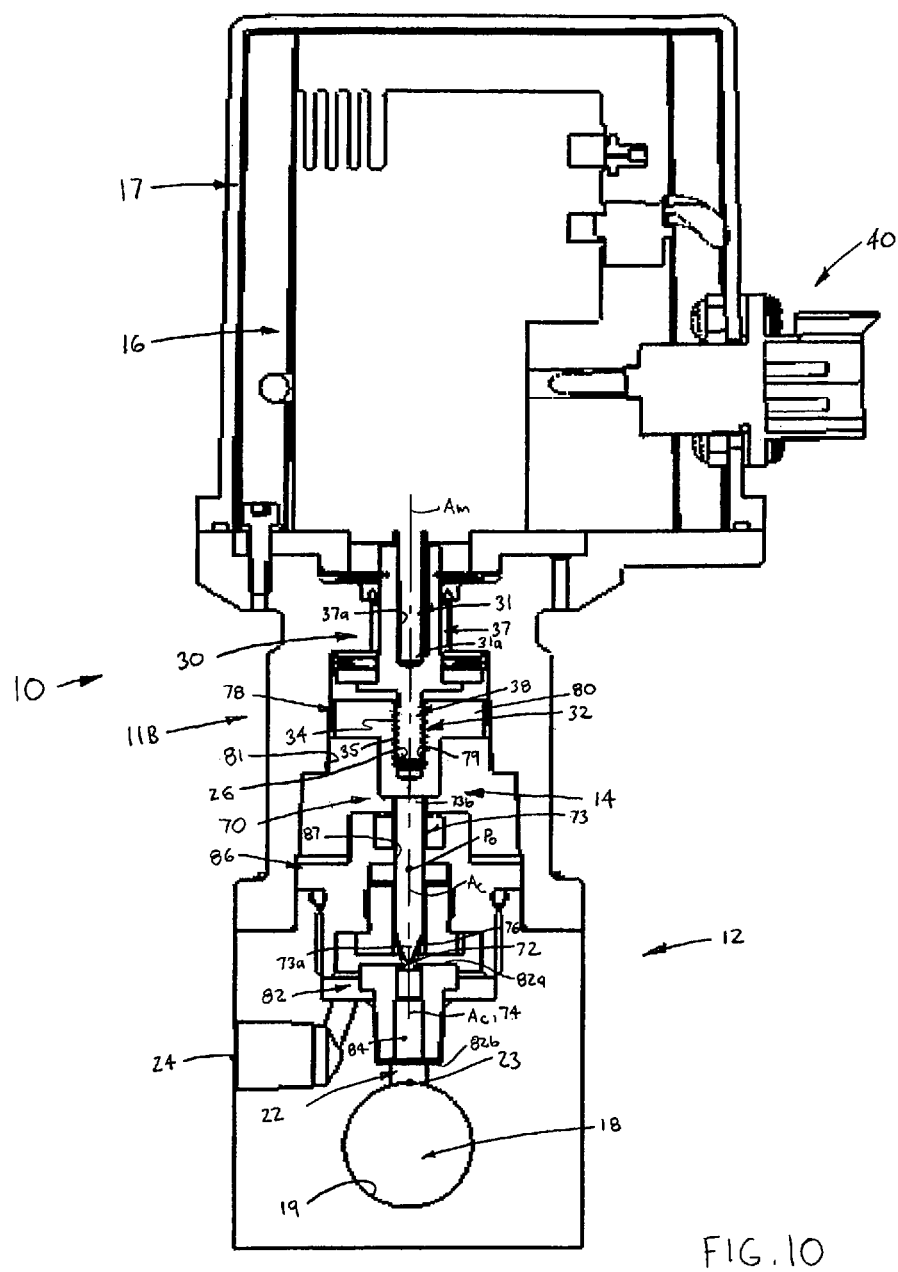
FIG. 10 is an axial cross-sectional view of the vent valve of FIG. 9.
Figure 16:
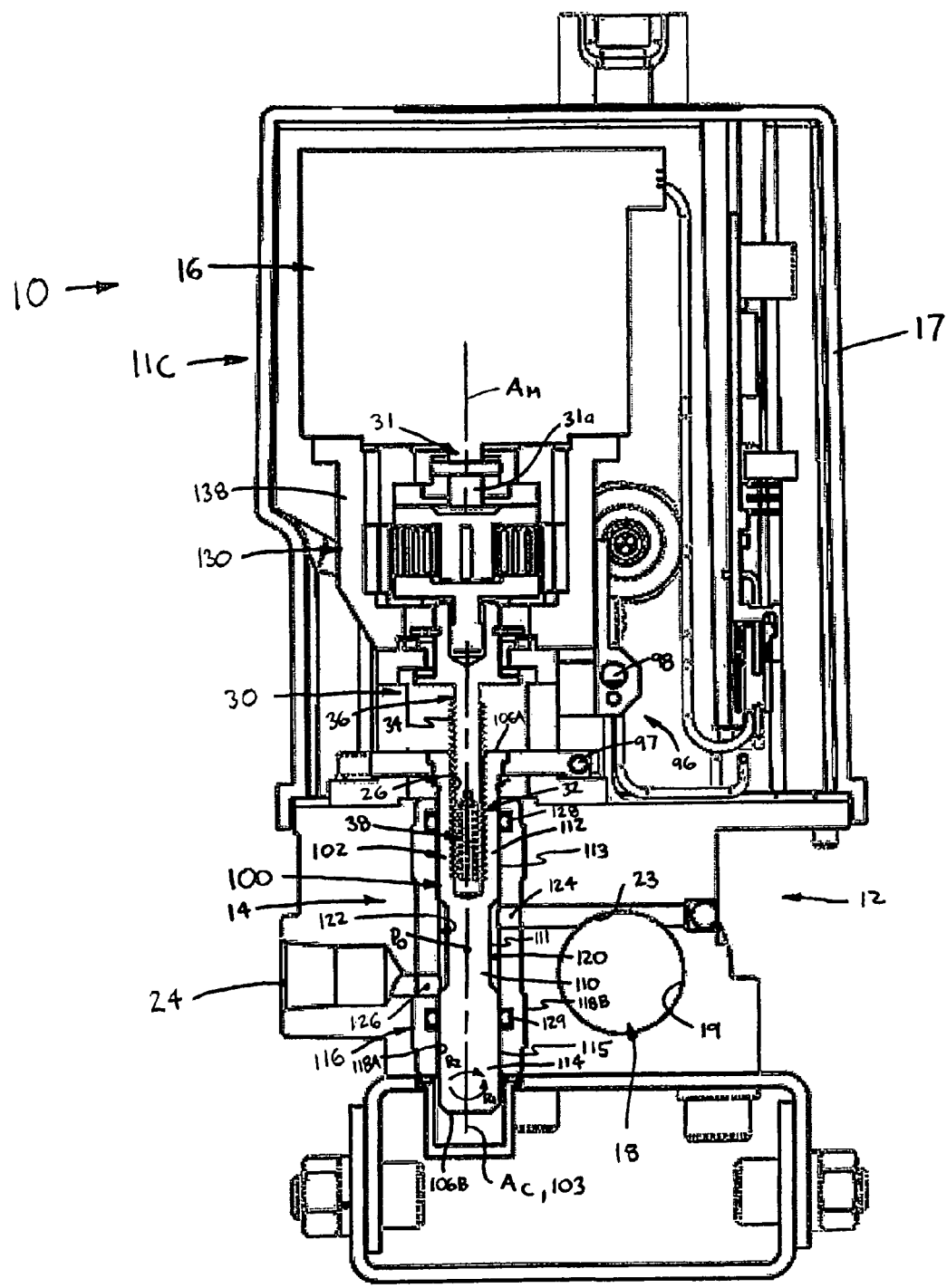
FIG. 16 is an axial cross-sectional view of the vent valve of FIG. 15.
Figure 18:
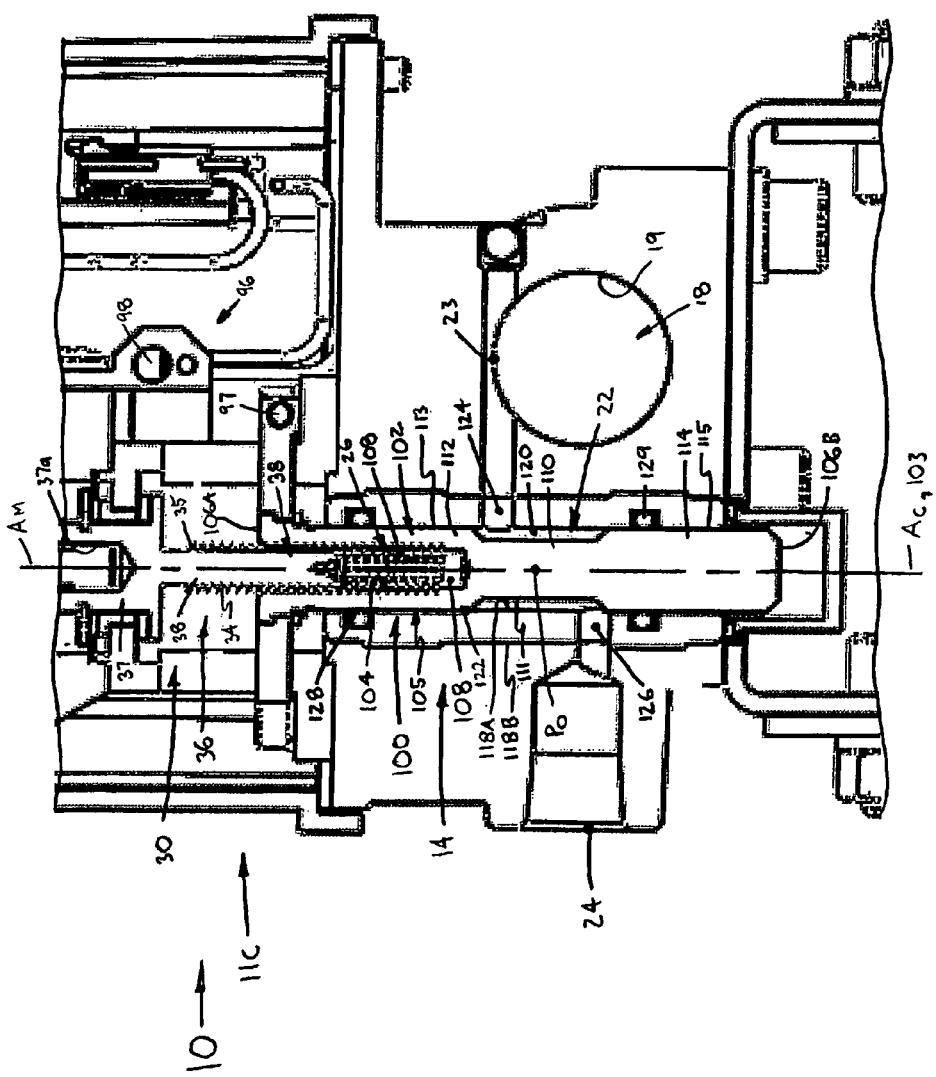
FIG. 18 is an enlarged broken-away view of the lower portion of FIG. 17A, showing a spool closure element in an open position.
Figure 19:
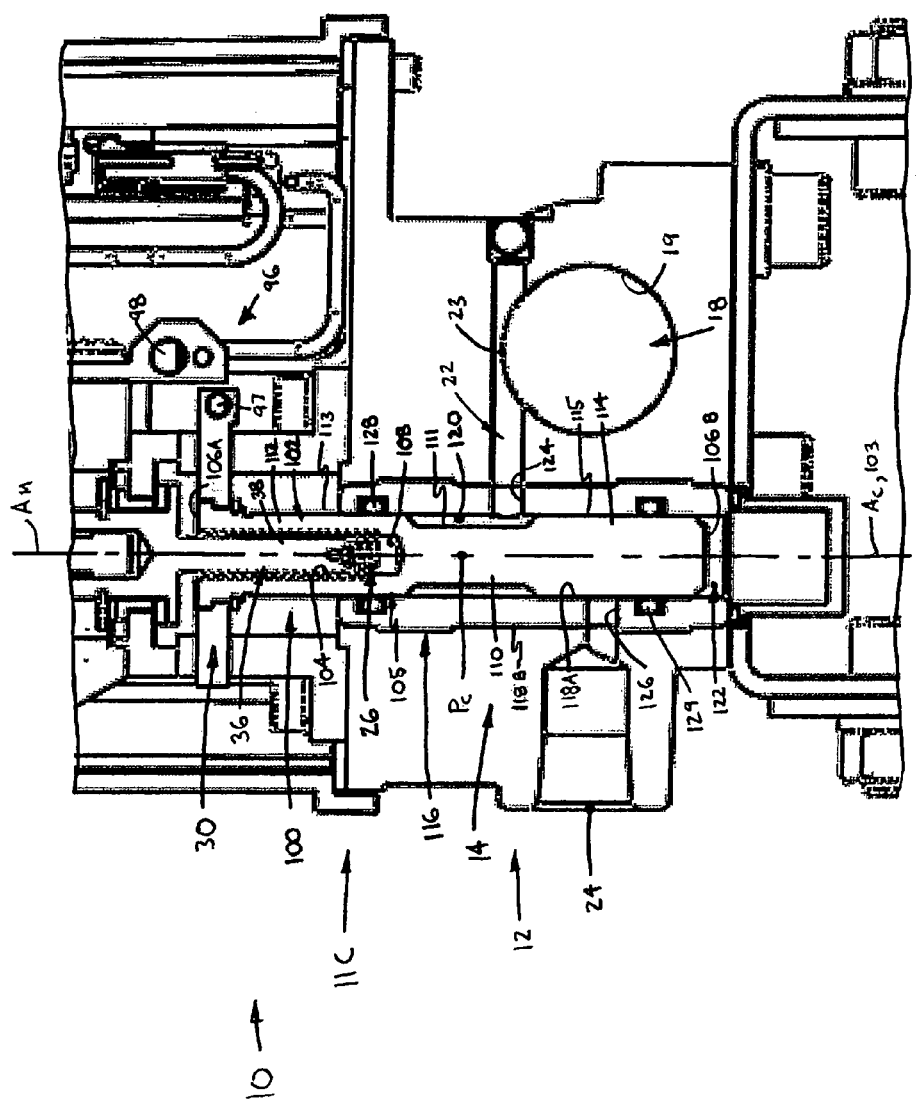
FIG. 19 is an enlarged broken-away view of the lower portion of FIG. 17B, showing the spool closure element in a closed position.
Figure 20:
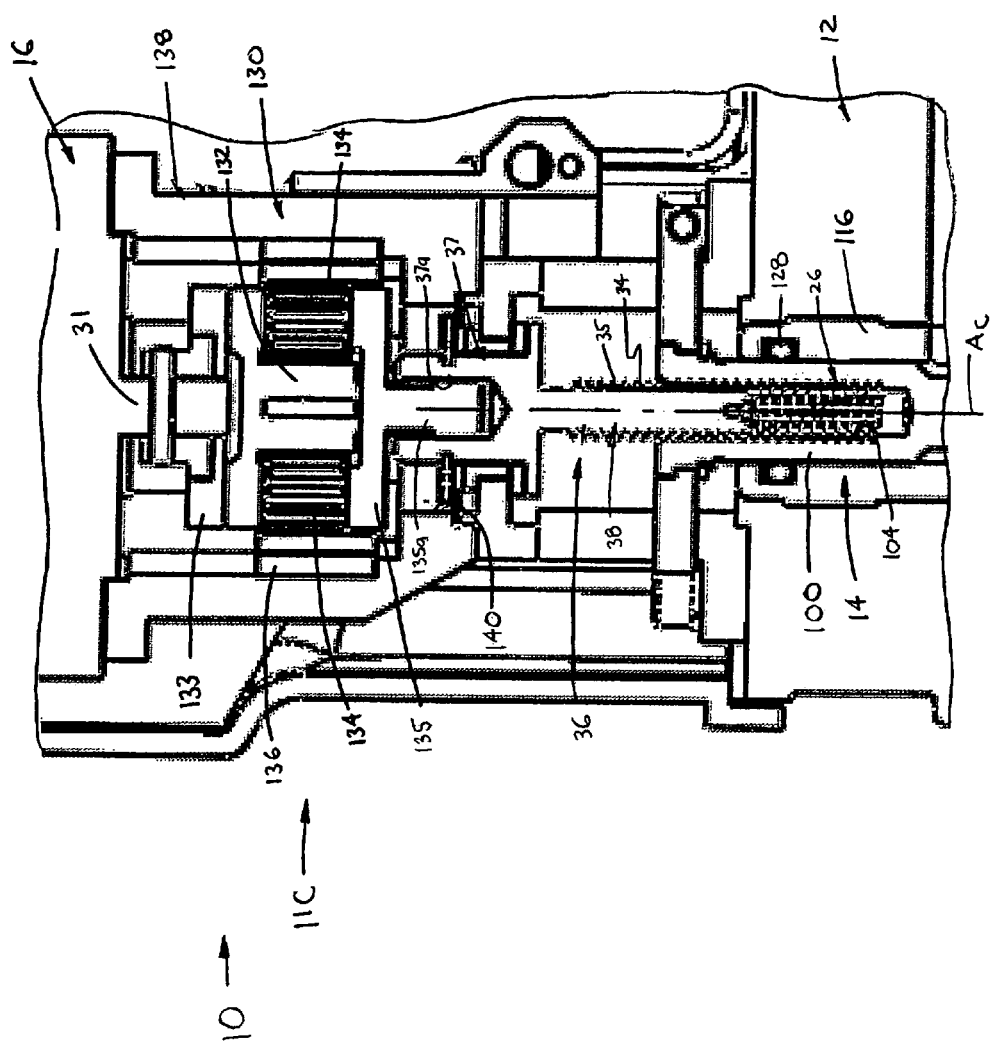
FIG. 20 is an enlarged broken-away view of the central portion of FIG. 16, showing a gear train of the motor shaft.

Referring to FIGS. 3-6, 10, 11, and 18-20, the threaded portion 32 of the motor shaft 30 is preferably provided by an outer circumferential surface 34 with at least one external thread 35 that is engageable with a threaded inner circumferential surface 54A of the closure element 14, as described below. Preferably, the motor shaft 30 includes a rotor axle 31 with an outer end 31a and a drive member 36 connected with the axle outer end 31a and providing the shaft threaded portion 32. In the first and second valve constructions 11A, 11B, the drive member 36 is directly mounted on the axle outer end 31a as shown in FIGS. 3 and 10, and in the third valve construction 11C, the motor axle 31 and the drive member 36 are connected through a gear train 130, as shown in FIGS. 16 and 20 and described in detail below. Further, the drive member 36 preferably includes a generally cylindrical mounting portion 37 with a bore 37a for receiving the shaft end 31a (see, e.g., FIGS. 3 and 10) or a shaft portion 135a of a gear train output member 135, and a drive rod portion 38 providing the outer surface 34 and the one or more threads 35. Alternatively, the motor axle 31 may have an integral threaded portion (not shown) providing the shaft threaded portion 32. As a further alternative, the driver 36 (or the axle 31) may have an internally threaded bore engageable with an externally threaded portion of the closure element 14 (structure not shown).

Referring to FIGS. 2-6, in a first preferred construction, the vent valve 10 is "spool" type valve 11A in which the closure element 14 is a spool 50. The spool 50 includes a cylindrical rod 52 having a centerline 53, inner and outer circumferential surfaces 54A, 54B, respectively, and two ends 55A, 55B spaced apart along the centerline 53. The inner surface 54A is threaded to form a threaded bore 56 extending inwardly from the upper, open end 55A and generally along the centerline 53 toward the lower, closed end 55B. The threaded bore 56 provides the closure element threaded portion 26, as described above, and is sized and configured to threadedly engage with the drive rod portion 38 of the preferred motor shaft drive member 36. Thus, rotation of the motor shaft 30 drives the spool 50 to displace along the axis $A_C$, as described above, due the interaction of the thread(s) on the rotating drive member 36 with the thread(s) of the threaded bore 56.

Further, with the spool type valve 11A, the valve body 12 preferably includes a sleeve 60 having inner and outer circumferential surfaces 61A, 61B, respectively, the inner surface 61A defining a central bore 62 providing a section of the vent passage 22. The sleeve 60 also has first and second ports 63, 64 each extending between the inner and outer surfaces 61A, 61B. The first port 63 is fluidly coupled with the vent inlet port 23 and the second port 64 is fluidly coupled with the vent outlet port 24. Preferably, the sleeve 60 is formed of hardened steel (e.g., at about 54 on the Rockwell C scale) and the ports 63, 64 are sized relatively large, for example, with a diameter of about twenty-five hundredths of an inch (0.25"). Such relatively large ports 63, 64 minimize wear on the valve components, increase valve reliability by ensuring sufficient flow of stiffer lubricants, such as high viscosity grease, and reduce the potential for clogging of the valve 10. Further, with such a valve sleeve 60, the closure element spool rod 52 is disposed at least partially within the sleeve bore 62, the bore 62 and rod 52 preferably being relatively sized so as to provide a radial clearance within a range of three micrometers and five micrometers (0.001 mm-0.003 mm). Due to this minimal clearance, lubricant leakage between the spool 50 and the sleeve 60 is substantially prevented.

Figure 4B:
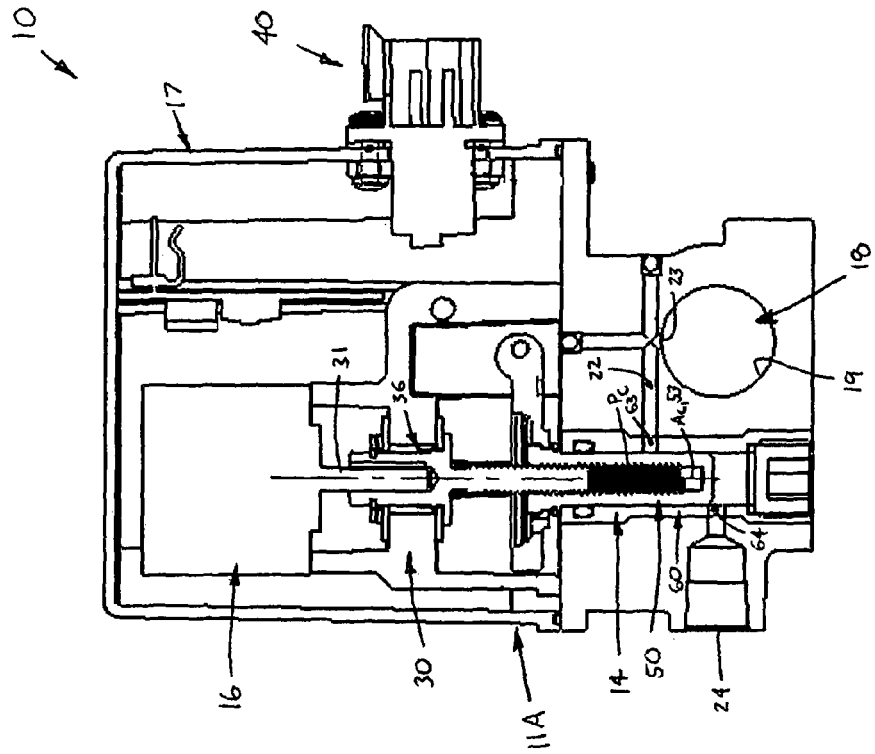
FIGS. 4A and 4B, collectively
Figure 4A:
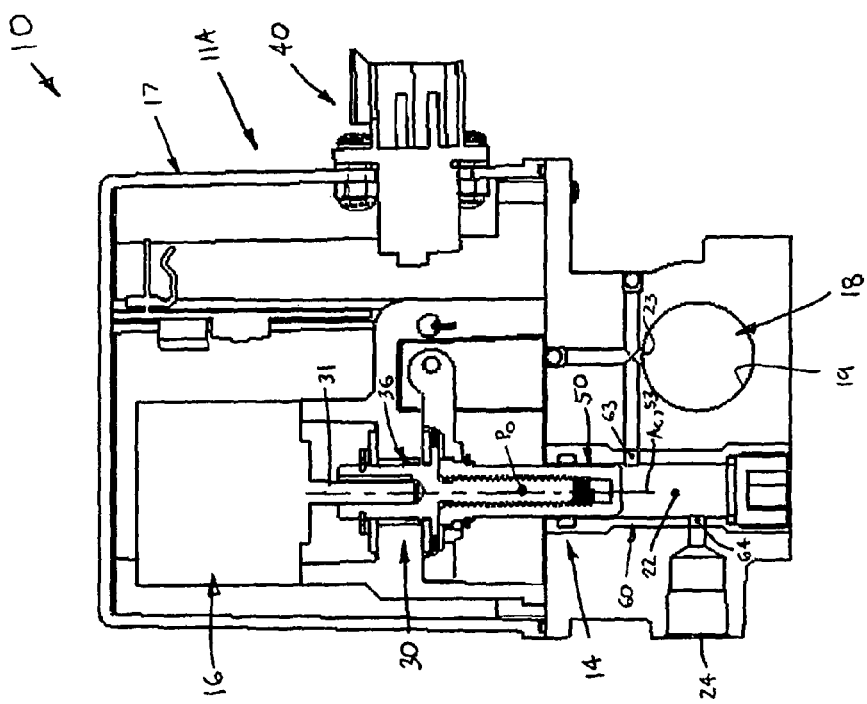
Figure 6:
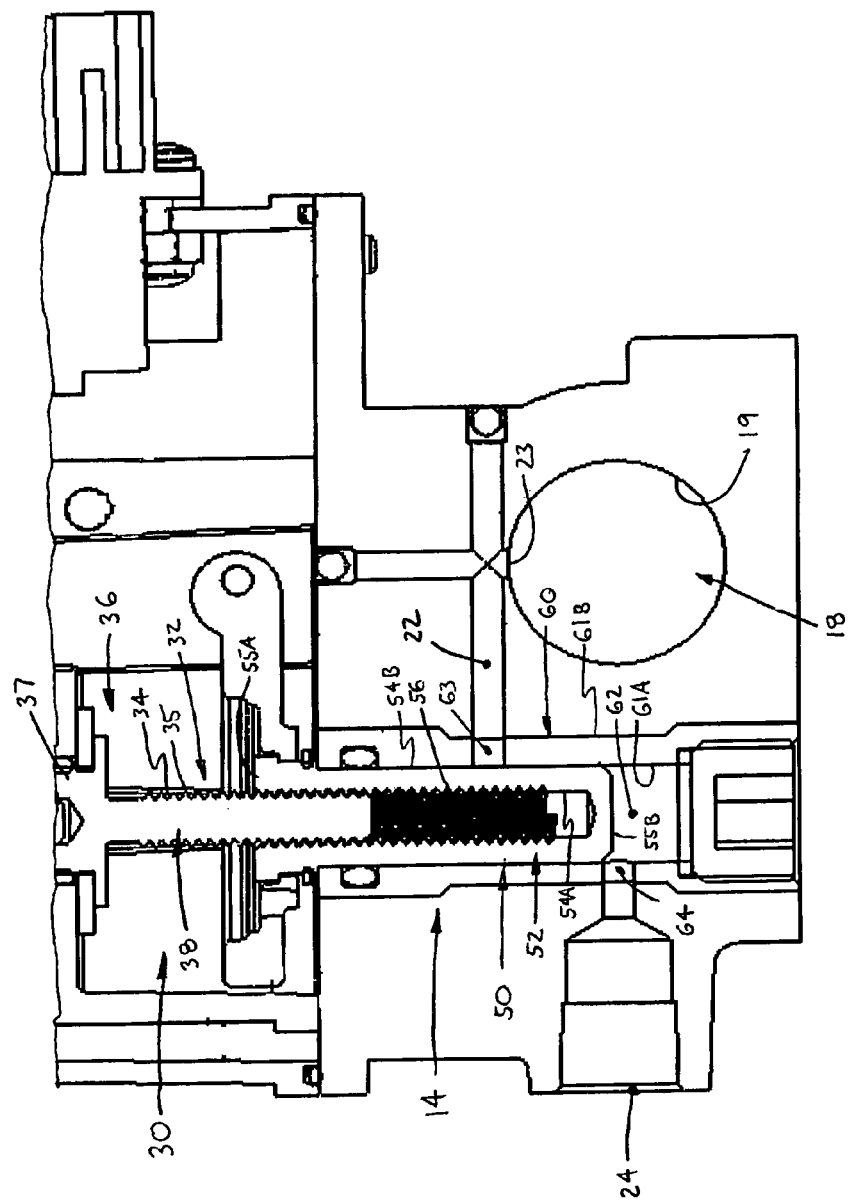
FIG. 6 is an enlarged broken-away view of the lower portion of FIG. 4B, showing the spool closure element in a closed position.

Furthermore, the spool rod 52 is positioned to substantially obstruct at least one of the first and second ports 63, 64 when the closure element 14 is located at the closed position $P_C$, and preferably only the first port 63, as shown in FIGS. 4B and 6. Due to the pressure of lubricant in the first port 63 being exerted on the spool 50 in a direction perpendicular to the closure element axis $A_C$, the pressure cannot back drive the closure element 14, such that the motor 16 is not required to exert any torque on the closure element 14 to maintain the element 14 at the closed position $P_C$. When the closure element 14 is located in the open position $P_O$, the spool rod 52 is spaced above both of the sleeve ports 63, 64. As such, the vent inlet and outlet ports are fluidly coupled by the ports 63, 64 and a section of the sleeve bore 62, as shown in FIGS. 3, 4A and 5.

Referring to FIGS. 11-13, in a second preferred construction, the vent valve 10 is "poppet" type valve 11B in which the closure element 14 is a poppet 70 and the valve body 12 has a seating surface 72 extending circumferentially about a section of the valve vent passage 22. The poppet 70 includes an elongated bar 73 with a centerline 74, an outer circumferential surface 75, and first and second ends 73a, 73a spaced apart along the centerline 74. The outer surface 75 has a tapering surface section 76 at the bar first, lower end 73a which is engageable with the valve seating surface 72 when the closure element 14 is located at the closed position $P_C$, so as to thereby substantially prevent flow through the vent passage 22. Further, the poppet 70 also includes a generally cylindrical drive member 78 attached to the second, upper end 73b of the elongated bar 73. The drive member 78 has a central threaded bore 79 providing the closure member threaded portion 26 and has a circular flange 80 the slides within an inner guide surface 81 of the valve body 12.

Figure 11B:
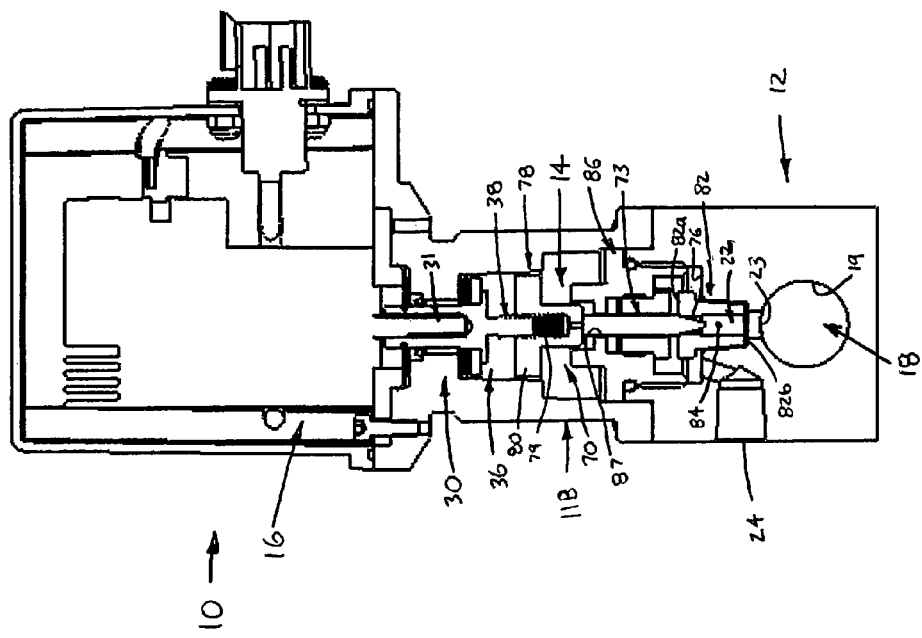
FIGS. 11A and 11B, collectively
Figure 11A:
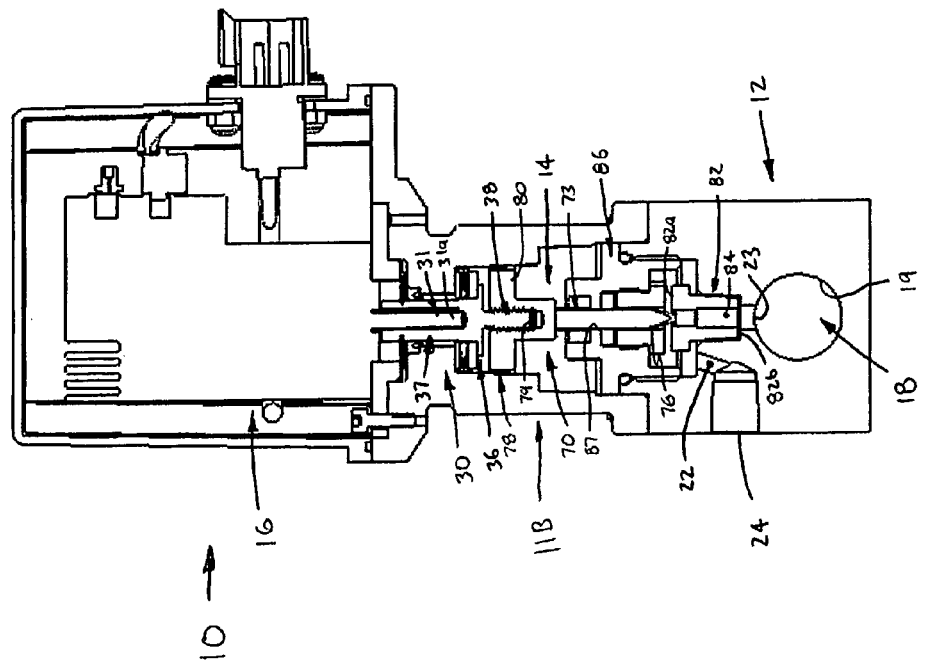

Preferably, the valve body 12 includes a generally cylindrical insert member 82 disposed within the vent passage 22 and having two opposing, upper and lower ends 82a, 82b and a central bore 84 extending between the two ends 82a, 82b. The bore 84 fluidly couples the vent inlet and outlet ports 23, 24 when the poppet 70 is in the open position $P_O$, as shown in FIGS. 10, 11A and 12. Further, the upper end 82a of the insert member 82 has an annular surface extending circumferentially about the central bore 84 and providing the valve seating surface 72. With this structure, when the closure element 14 displaces to the closed position $P_C$, the lower end 73a of the poppet bar 73 enters the upper end of insert bore 84 until a portion of the tapering surface section 76 seats against the insert surface 85 to substantially seal the vent passage 22. Preferably, the poppet 70 and the valve insert member 82 are formed of hardened steel, most preferably having a hardness of about fifty-five on the Rockwell C scale (55 RC), to minimize erosion of these valve components. Furthermore, with the poppet-type valve 11B, the valve body 12 preferably further includes a generally cylindrical guide member 86 with a central opening 87 sized to receive the poppet bar 73. As such, the opening 87 guides the sliding motion of the bar 73 when the bar 73 linearly displaces between the closure element open and closed positions $P_O$, $P_C$.

Referring now to FIGS. 15-21, in a third, presently most-preferred construction, the vent valve 10 is again "spool" type valve 11C, similar to the first valve construction 11A, in which the closure element 14 is a spool 100. The spool 100 includes a cylindrical rod 102 having a centerline 103, inner and outer circumferential surfaces 104, 105, respectively, and two ends 106A, 106B spaced apart along the centerline 103. The inner surface 104 is threaded to form a threaded bore 108 extending inwardly from the upper, open end 106A and generally along the centerline 103 toward the lower, closed end 106B. The threaded bore 108 provides the closure element threaded portion 26, as described above, and is sized and configured to threadedly engage with the drive rod portion 38 of the preferred motor shaft drive member 36. Thus, rotation of the motor shaft 30 drives the spool 100 to displace along the axis $A_C$, as described above, due the interaction of the thread(s) on the rotating drive member 36 with the thread(s) of the threaded bore 108.

Further, the rod 102 is preferably formed with a central undercut portion 110 defined between upper and lower radially-larger closures portions 112, 114. Each of the upper and lower closure portions has a surface section 113, 115, respectively, that is sized to fit relatively closely (i.e., a sliding fit) within the inner circumferential surface 118A of a valve sleeve 116, as described below. Also, the rod undercut portion 110 has a surface section 111 that is spaced radially inwardly from the sleeve inner surface 118A so as to define an annular flow channel 120, as discussed in greater detail below.

With the spool type valve 11C, the valve body 12 preferably include a generally tubular sleeve 116 having inner and outer circumferential surfaces 118A, 118B, respectively, the inner surface 118A defining a central bore 122 providing a section of the vent passage 22. The sleeve 116 also has first and second ports 124, 126 each extending between the inner and outer surfaces 118A, 118B. The first port 124 is fluidly coupled with the vent inlet port 23 and the second port 126 is fluidly coupled with the vent outlet port 24. Preferably, the sleeve 116 is formed of hardened steel (e.g., at about 54 on the Rockwell C scale) and the ports 124, 126 are sized relatively large, for example, with a diameter of about twenty-five hundredths of an inch (0.25"), so as to minimize wear on the valve components, increase valve reliability and reduce the risk of clogging, as discussed above with the first valve construction.

With such a valve sleeve 116, the closure element spool rod 102 is disposed at least partially within the sleeve bore 122, the bore 122 and rod 102 preferably being relatively sized so as to provide a radial clearance within a range of three micrometers and five micrometers (0.001 mm-0.003 mm) between each of the closure surface sections 113, 115 and the sleeve inner surface 118A. Due to this minimal clearance, lubricant leakage between the spool 100 and the sleeve 116 is substantially prevented. However, the valve 11C preferably includes upper and lower circular sealing members 128, 129 (e.g., O-rings) disposed about the upper and lower closure portions 112, 114 to provide additional leakage prevention.

Figure 17A:
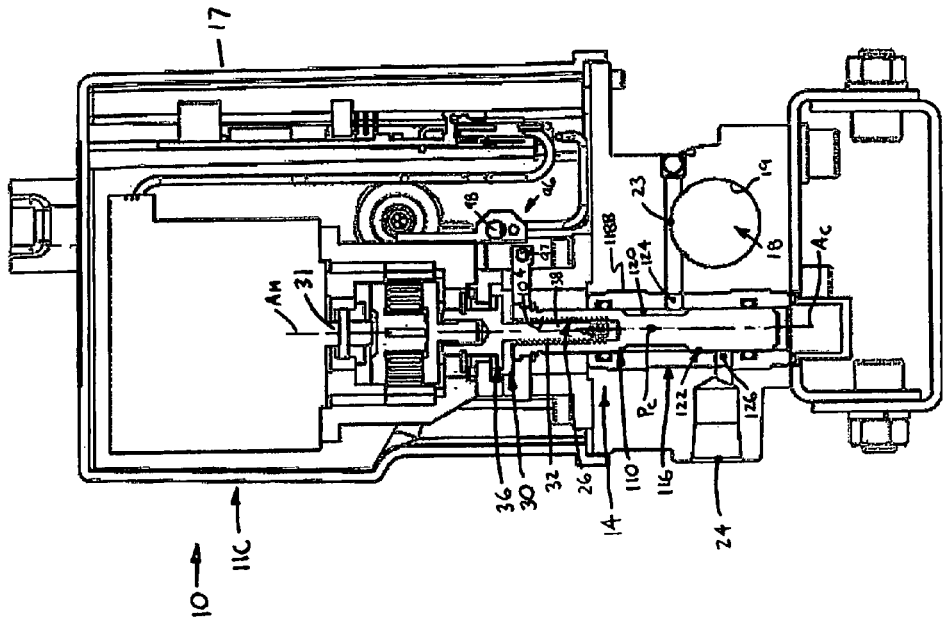
FIGS. 17A and 17B, collectively
Figure 17B:
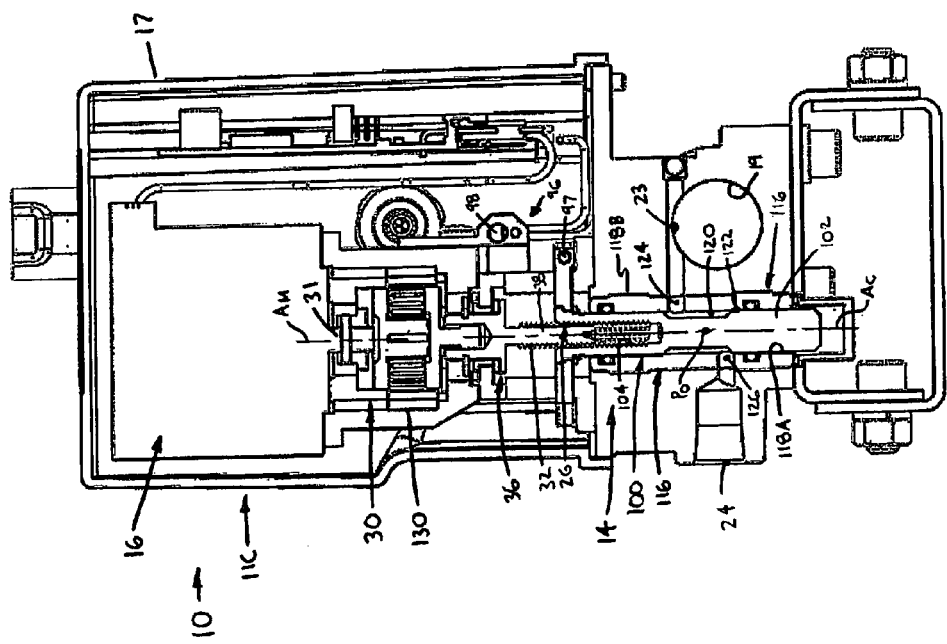

Further, the spool rod 102 is positioned to substantially obstruct at least one of the first and second ports 124, 126 when the closure element 14 is located at the closed position $P_C$, and preferably only the second port 126, as shown in FIGS. 17B and 19. However, unlike the first construction spool valve 11A, a quantity of lubricant remains within the annular flow channel 120 and exerts pressure equally on the rod upper and lower closure sections 112, 114. As such, the lubricant cannot back drive or otherwise displace the spool 100 when the spool 100 is located in the closed position $P_C$, such that no motor torque is required to maintain the spool 100 at the closed position $P_C$. When the closure element 14 is located in the open position $P_O$, the spool rod 102 is positioned such that the undercut portion 110 extends across both of the first and second sleeve ports 124, 126, as best shown in FIG. 18. As such, the vent inlet and outlet ports 23, 24 are fluidly coupled by the sleeve ports 124, 126 and the annular flow channel 120, as shown in FIGS. 16, 17A and 18. Furthermore, unlike the first two valve constructions 11A, 11B, the spool 102 of the third valve construction 11C preferably displaces in a generally upward direction when moving between the open position $P_O$ (FIG. 18) and the closed position $P_C$ (FIG. 19).

Figure 21:
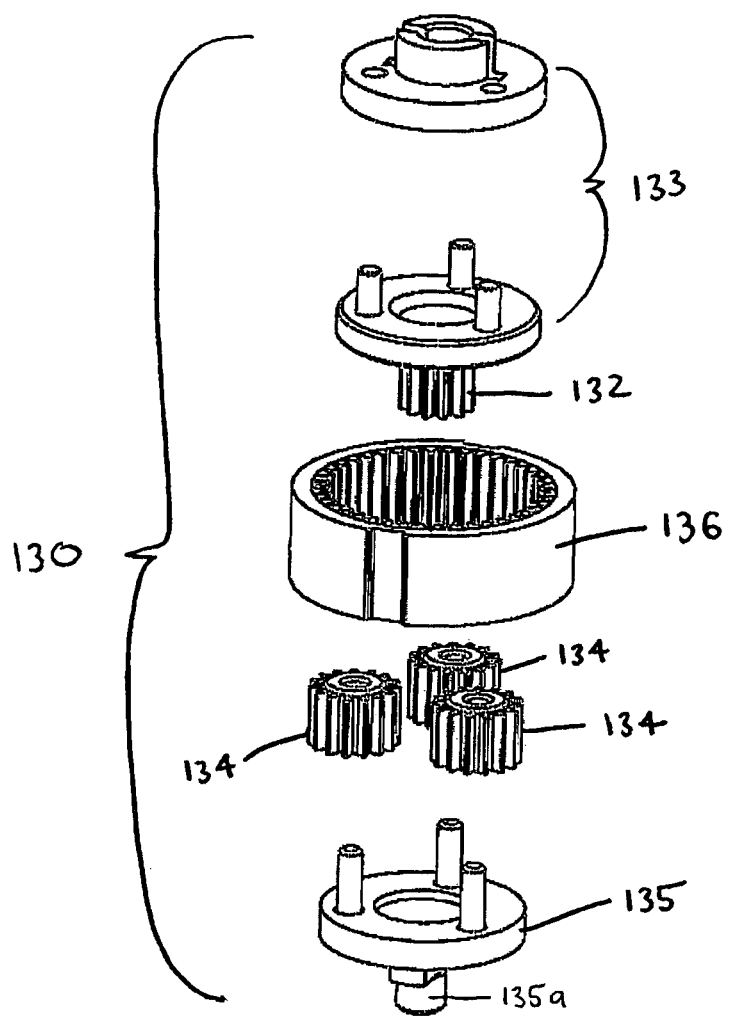
FIG. 21 is an enlarged portion of FIG. 15, showing the gear train of the motor shaft.

Referring to FIGS. 15-17, 20 and 21, in order to enhance the capability of handling highly viscous lubricants, the motor shaft 30 of the third valve construction 11C is preferably provided with a gear train 130 to increase torque transmission from the rotor axle 31 to the drive member 36 and the spool 100. As best shown in FIGS. 20 and 21, the gear train 130 is preferably a planetary gear train including a sun gear 132 mounted on an input member 133 attached to the motor rotor axle 31 and a plurality of planet gears 134, preferably three gears 134. The planet gears 134 are disposed about and engaged with the sun gear 132 and are rotatably mounted on an output member 135. The output member 135 has a shaft portion 135 connected with the drive member 36 and a fixed ring gear 136 is disposed about and engaged with all of the planet gears 134. The gear train 130 is configured such that rotation of the motor axle 131 rotates the input member 131 and the attached sun gear 132, causing the engaged planet gears 134 to roll around the sun gear 132 and within the fixed ring gear 136. As the planet gears 134 circle about the sun gear 132, the attached output member 135 is rotated about the shaft central axis $A_C$, thereby rotating the drive member 36 about the axis $A_C$ to linearly displace the spool 100 along the axis $A_C$. Preferably, the gear train 130 is contained within a gear box 138 attached to the motor 16, the drive member 36 extending through a gear box opening 140 and coupling to the output member 135.

Figure 7:
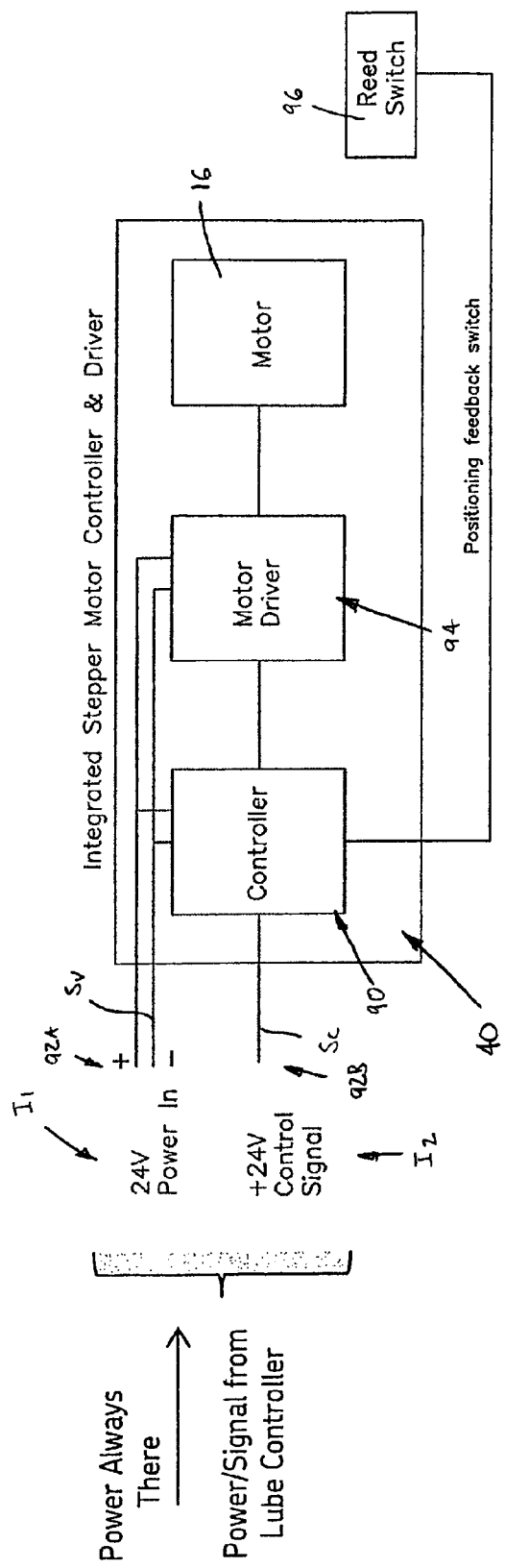
FIG. 7 is a schematic diagram of the first construction valve showing a preferred valve control layout.
Figure 8:
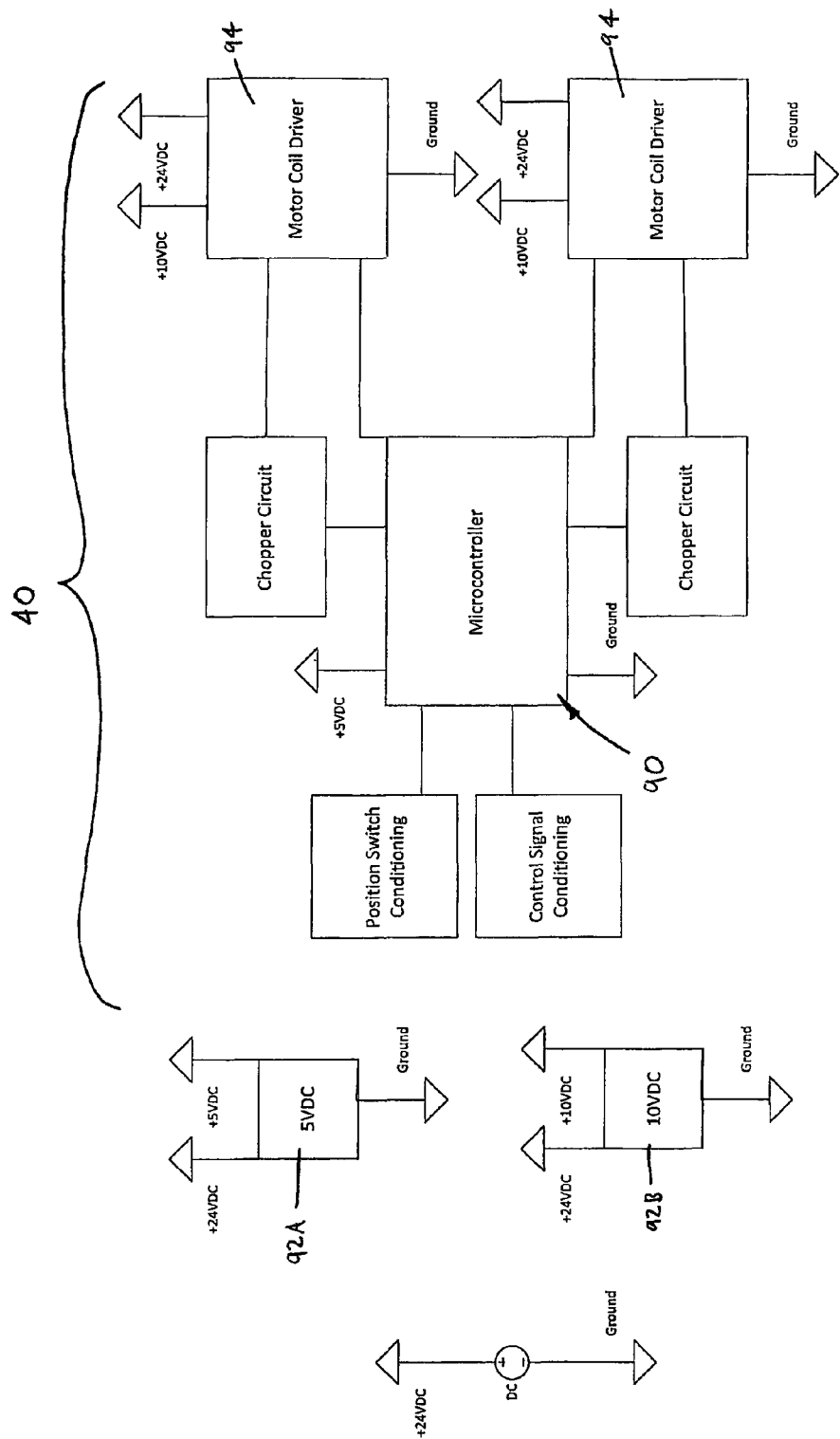
FIG. 8 is a more detailed schematic view of the control depicted in FIG. 7, showing a preferred microcontroller.
Figure 9:
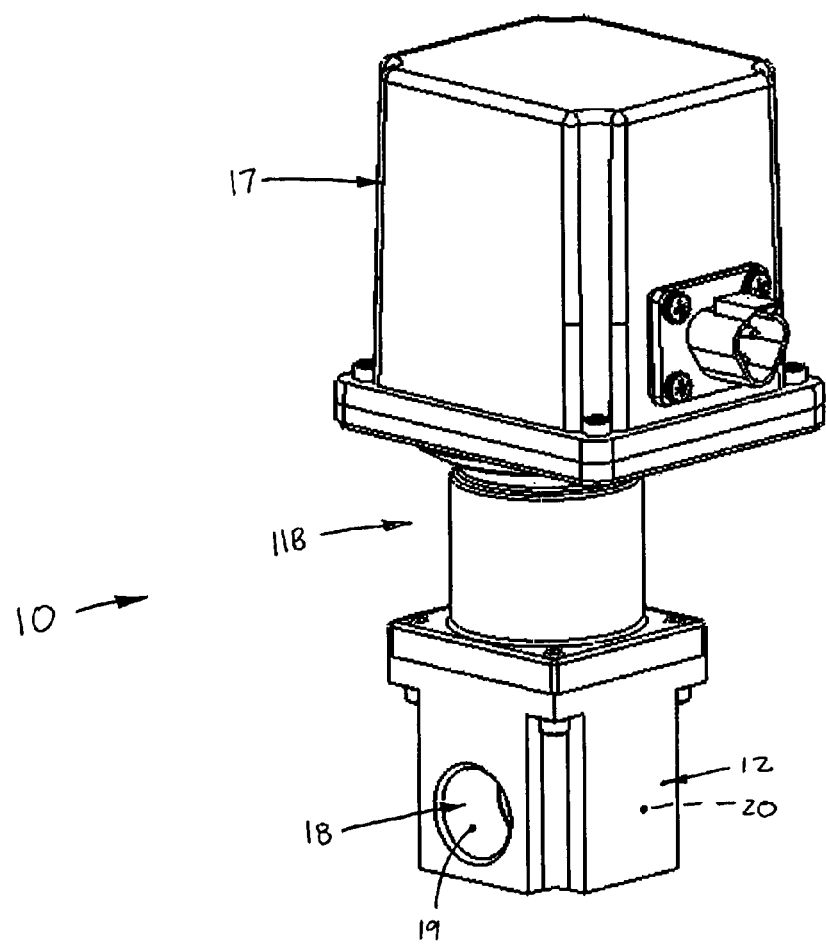
FIG. 9 is a perspective view of a second construction of the vent valve in accordance with the present invention.
Figure 14:
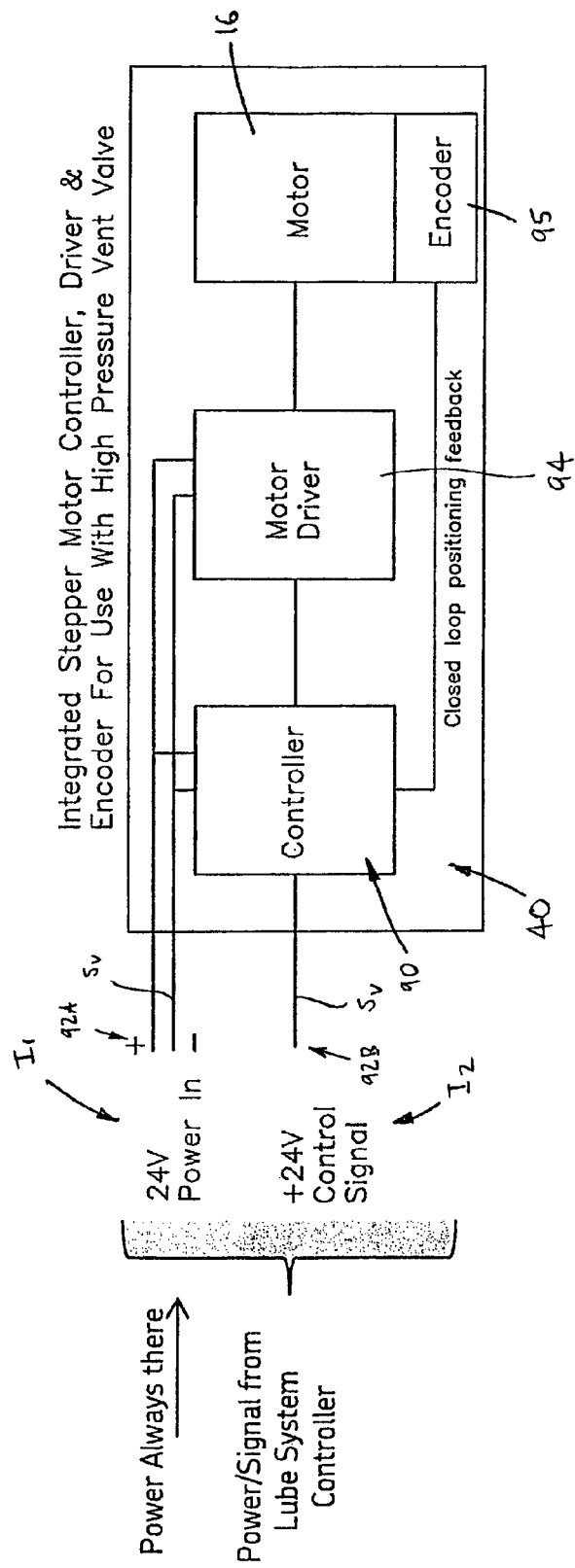
FIG. 14 is a schematic diagram of the second construction valve showing a preferred valve control layout.
Figure 15:
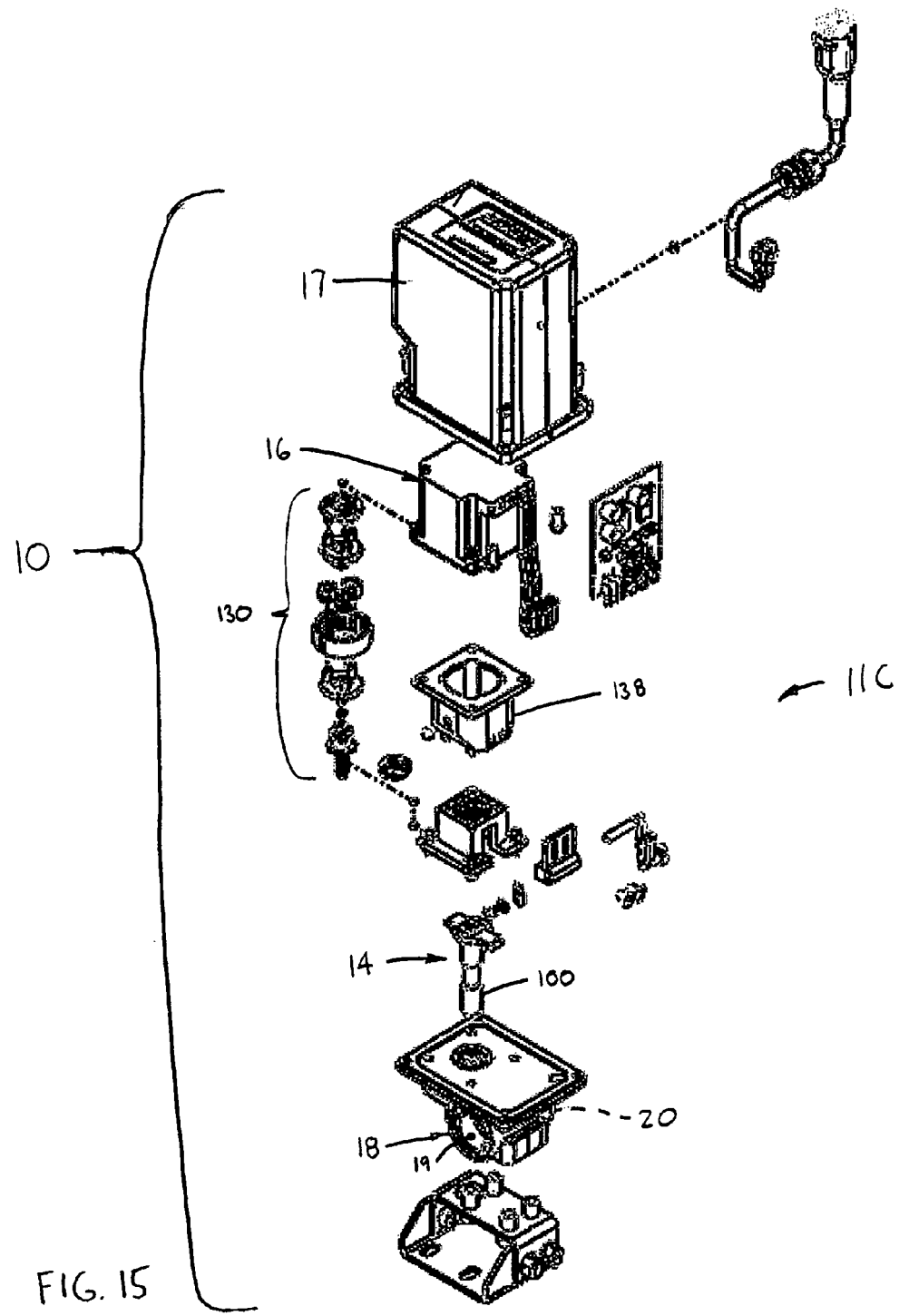
FIG. 15 is an exploded view of a third construction of the vent valve in accordance with the present invention.

Referring now to FIGS. 7, 8 and 14, with all three valve constructions 11A, 11B and 11C, the control 40 preferably includes a microcontroller 90, first and second input terminals 92A, 92B connected with the microcontroller 90, and at least one and preferably two motor coil driver circuits 94. Each drive circuit 94 is connected with the microcontroller 90, with a separate coil (not shown) of the motor 16, and with the power supply 42, such that the drive circuits 94 are continuously receiving electric power (preferably at 24 Volts). The first terminal 92A is connected with the power supply (not shown) and the second terminal 92B is connected with the lubrication controller 4. With this structure, the first input $I_1$ is a voltage signal $S_V$ received by the microcontroller 90 through the first terminal 92A and the second input $I_2$ is a combination of the voltage signal $S_V$ through the first terminal 92A and a control signal $S_C$ received by the microcontroller 90 through the second terminal 92B.

Further, the microcontroller 90 is programmed to operate the motor coil driver circuits 94 such that electric current is directed to flow through the motor coils (not shown) in one direction when the microcontroller 90 receives the first input $I_1$ and current is directed to flow through the motor coil in the opposing direction when the microcontroller 90 receives the second input $I_2$. More specifically, the relief valve 10 is preferably a "normally open" valve with the closure element 14 located at the open position $P_O$ and the control 40 continuously receiving the first input $I_1$, specifically twenty four volts (24 V) with the motor drive circuit(s) 94 always under power. When a lubrication cycle is commenced by the lubricant system 1, the relief passage 22 must be closed, such that the lubrication controller 4 sends a control signal $S_C$ to the microcontroller 90, which is received through the second input terminal 92B, such that the microcontroller 90 is receiving the second input $I_2$. The microcontroller 90 then operates the drive circuit(s) 94 to provide current to the motor coils in the first current direction until the motor shaft 30 has rotationally displaced the predetermined number of revolutions to locate the closure element 14 at the closed position $P_C$.

In the poppet style valve 11B, the motor 16 preferably includes an integral encoder 95 connected with the control 40 and configured to detect the rotational displacement of the motor shaft 40. With the encoder 95, the control 40 is configured to determine when the closure element 14 is located at the closed position $P_C$ from input received from the encoder 96, to thereby ensure that the poppet 70 has engaged with the valve seating surface 72. When the poppet 70 is seated, the encoder 95 sends a signal to the microcontroller 90 to indicate that the closed position $P_C$ has been reached, and preferably the microcontroller 90 then operates the drive circuit(s) 94 to provide a substantially lesser current to the motor coil(s) sufficient to cause the motor 16 to provide a minimal torque on the poppet 70. Such a minimal torque may be necessary to prevent back driving of the poppet 70 since the pressure of lubricant in the insert member bore 84 is exerted on the poppet 70 in a direction along the closure element axis $A_C$ and toward the open position $P_O$.

Further, when the lubricant system 1 has reached a particular pressure, the lubricant controller 4 sends a signal to the pump 3 to stop pumping lubricant from the supply 2 and stops sending the control signal $S_C$ to the vent valve control 40. As such, the microcontroller 90 determines that the only input is the first input $I_1$ and that the closure element 14 is at the closed position $P_C$. In response, the microcontroller 90 then operates the drive circuit(s) 94 to provide current to the motor coils in the second current direction until the motor shaft 30 has rotationally displaced the predetermined number of revolutions to locate the closure element 14 at the open position $P_O$.

In the spool type valve constructions 11A and 11C, the valve 10 further comprises a sensor 96, preferably a switch, connected with the control 40 and configured to sense when the spool 50 is located at the open position $P_O$ (first construction 11A; FIG. 3) or in the closed position $P_C$ (third construction 11C; FIG. 16). As shown in FIGS. 3 and 16, the switch 96 is preferably a reed switch that includes a detector magnet 97 connected with the spool 50 and a switching member 98 disposed in the valve body 12 that is located to be activated by the magnet 97 when the spool 50 is located at the open position $P_O$ (FIG. 3) or alternatively located in the closed position $P_C$ (FIG. 16). As such, the microcontroller 90 is able to determine with certainty when the spool type valve 11A is located at one of the predetermined positions $P_O$ or $P_C$ and can thereafter operate the preferred stepper motor 16 to rotate the shaft 30 an appropriate number of rotations to linearly displace the closure element 14 to the other position $P_C$, $P_O$. Thereafter, with any of the valve types 11A, 11B or 11C, the control 40 will continue to receive the first input $I_1$ from the power supply 42 and the valve closure element 14 will remain in the open position $P_O$ until another lubrication cycle is initiated in the lubrication system 1.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined herein and in the appended claims.

We claim:

1. A vent valve for a lubrication system, the lubrication system having a lubricant supply and a lubricant dispenser, the vent valve comprising:

a valve body having a flow passage, the flow passage having an inlet fluidly coupled with the supply and an outlet fluidly coupled with the dispenser, and a vent passage with an inlet port fluidly coupled with the flow passage and an outlet port fluidly separate from the flow passage outlet;

a closure element disposed at least partially within the vent passage, having a threaded portion and being linearly displaceable between an open position at which the vent inlet and outlet ports are fluidly coupled to permit lubricant to flow from the primary passage and out of the body through the vent outlet port and a closed position at which fluid flow between the vent inlet and outlet ports is substantially prevented such that all lubricant flowing into the flow passage inlet flows out of the flow passage outlet; and a motor having a shaft rotatable about a central axis, the shaft having a threaded portion threadedly engaged with the closure element threaded portion such that rotation of the shaft in a first direction about the axis displaces the closure element toward the closed position and rotation of the shaft in a second, opposing direction about the axis displaces the closure element toward the open position.

2. The vent valve as recited in claim 1 wherein the motor threaded portion and the closure element threaded portion are configured such that the engagement of the two threaded portions substantially prevents displacement of the closure element when the closure element is subjected to lubricant pressure.

3. The vent valve as recited in claim 1 further comprising a control operatively coupled with and configured to drive the motor to controllably displace the closure element between the open and closed positions.

4. The vent valve as recited in claim 3 wherein the control is configured to receive first and second inputs, to drive the motor to rotate the shaft in the first direction when the control receives the first input and the closure element is at the open position and to drive the motor to rotate the shaft in the second direction when the control receives the second input when the closure element is at the closed position.

5. The vent valve as recited in claim 4 wherein the first input is a voltage signal from a power supply and the second input is a combination of the power supply voltage signal and a control signal from a lubrication system controller.

6. The vent valve as recited in claim 4 wherein the motor is a stepper motor and the control is configured to drive the motor to rotate a predetermined number of revolutions about the axis in the first direction when the control receives the first input and the closure element is at the open position and to drive the motor to rotate a predetermined number of revolutions about the axis in the second direction when the control receives the second input and the closure element is at the closed position.

7. The vent valve as recited in claim 4 wherein the control includes a microcontroller, first and second terminals connected with the microcontroller, the first terminal being connectable with a power supply and the second terminal being connectable with a lubrication controller, and at least one motor coil driver circuit connected with the microcontroller and a coil of the motor.

8. The vent valve as recited in claim 7 wherein:
the first input is a signal received by the controller through the first terminal and the second input is a combination of a signal received by the controller through the first terminal and a signal received by the controller through the second terminal; and
the microcontroller is programmed to operate the motor coil driver circuit such that current is directed to flow through the motor coil in one direction when the control receives the first input and current is directed to flow through the motor coil in another, opposing direction when the controller receives the second input.

9. The vent valve as recited in claim 4 further comprising a sensor connected with the control and configured to sense when the closure element is located at one of the open position and the closed position.

10. The vent valve as recited in claim 1 wherein the motor is a stepper motor configured to rotate the motor shaft through a predetermined number of revolutions about the axis so as to displace the closure element between the open and closed positions.

11. The vent valve as recited in claim 1 wherein the motor includes an encoder connected with the control and configured to detect the rotational displacement of the motor shaft, the control being configured to determine when the closure element is located at the closed position from input received from the encoder.

12. The vent valve as recited in claim 1 wherein one of the motor threaded portion and the closure element threaded portion has an outer circumferential surface with at least one external thread and the other one of the motor threaded portion and the closure element threaded portion has an inner circumferential surface with at least one internal thread.

13. The vent valve as recited in claim 1 wherein the motor shaft includes a rotor axle with an outer end and a drive member connected with the axle outer end and providing the shaft threaded portion.

14. The vent valve as recited in claim 13 wherein the motor shaft includes a gear train connecting the rotor axle with the drive member.

15. The vent valve as recited in claim 1 wherein the closure element includes a cylindrical rod having a centerline, two ends spaced apart along the centerline, and threaded bore extending inwardly from one of the two ends and generally along the centerline toward the other one of the two ends, the threaded bore providing the closure element threaded portion.

16. The vent valve as recited in claim 15 wherein:
the valve body includes a sleeve having inner and outer circumferential surfaces, the inner surface defining a central bore providing a section of the vent passage, and first and second ports extending each between the inner and outer surfaces, the first port being fluidly coupled with the vent inlet port and a second port being fluidly coupled with the vent outlet port; and
the closure element rod is disposed at least partially within the sleeve and is positioned to substantially obstruct at least one of the first and second ports when the closure element is located at the closed position.

17. The vent valve as recited in claim 1 wherein:
the valve body includes a valve seating surface extending circumferentially about a section of the valve vent passage; and
the closure element includes an elongated bar, the bar having a centerline, first and second ends spaced apart along the centerline, the first end having a tapering surface engageable with the valve seating surface when the closure element is located at the closed position so as to substantially prevent flow through the vent passage, and a cylindrical drive member attached to the second end of the elongated bar and having a threaded bore providing the closure member threaded portion.

18. The vent valve as recited in claim 17 wherein the valve body includes a generally cylindrical insert member disposed within the vent passage and having two opposing ends and a central bore extending between the two ends, the bore fluidly coupling the vent inlet and outlet ports and one end of the insert member having an annular surface extending circumferentially about the central bore and providing the valve seating surface.

19. A vent valve for a lubrication system, the lubrication system having a lubricant supply and a lubricant dispenser, the vent valve comprising:
a valve body having a flow passage, the flow passage having an inlet fluidly coupled with the supply and an outlet fluidly coupled with the dispenser, and a vent passage with an inlet port fluidly coupled with the flow passage and an outlet port fluidly separate from the flow passage outlet port;
a closure element disposed at least partially within the vent passage and being linearly displaceable between a closed position at which fluid flow between the vent inlet and outlet ports is substantially prevented such that all lubricant flowing into the flow passage inlet flows out of the flow passage outlet and an open position at which the vent inlet and outlet ports are fluidly coupled to permit lubricant to flow from the primary passage and out of the body through the vent outlet port;

a motor having a shaft rotatable about a central axis, the shaft being engaged with the closure element such that rotation of the shaft in a first direction about the axis displaces the closure element toward the open position and rotation of the shaft in a second, opposing direction about the axis displaces the closure element toward the closed position; and a control operatively coupled with the motor and configured to receive first and second inputs, to drive the motor to rotate the shaft in the first direction when the control receives the first input and the closure element is at the open position and to drive the motor to rotate the shaft in the second direction when the control receives the second input when the closure element is at the closed position.

20. The vent valve as recited in claim 19 wherein the closure element has a threaded portion and the motor shaft has a threaded portion threadedly engaged with the closure element threaded portion such that rotation of the motor shaft linearly displaces the closure element.

* * * * *